United States Patent [19]

Bosen

[11] 4,135,063

[45] Jan. 16, 1979

[54] MODULAR, EXPANDABLE INTERCOM SYSTEM FOR A MULTIPLE-STATION TELEPHONE SUBSCRIBER INSTALLATION

[75] Inventor: Lynn R. Bosen, Costa Mesa, Calif.

[73] Assignee: San/Bar Corporation, Santa Ana, Calif.

[21] Appl. No.: 824,078

[22] Filed: Aug. 12, 1977

[51] Int. Cl.$^2$ .............................................. H04M 9/00
[52] U.S. Cl. ......................................... 179/99; 179/37
[58] Field of Search ........................ 179/37, 38, 39, 40, 179/1 H, 18 AD, 99

[56] References Cited

U.S. PATENT DOCUMENTS

| 3,584,151 | 6/1971 | Kielar | 179/1 H |
|---|---|---|---|
| 3,691,310 | 9/1972 | Fenton | 179/18 AD |
| 3,749,848 | 7/1973 | Knollman et al. | 179/99 |
| 3,757,056 | 9/1973 | Foulkes | 179/99 |
| 3,790,718 | 2/1974 | Jenkins, Jr. | 179/99 X |
| 3,826,875 | 7/1974 | Puig | 179/37 |
| 3,872,262 | 3/1975 | Kerman | 179/99 |
| 3,996,424 | 12/1976 | Agricola | 179/99 X |
| 4,009,354 | 2/1977 | Champan | 179/99 |

Primary Examiner—Thomas W. Brown
Attorney, Agent, or Firm—Jackson & Jones Law Corporation

[57] ABSTRACT

An intercom system for a key telephone installation which can be expanded and contracted to service a diverse number of subscriber units. The intercom system is expandable on a modular basis of eight subscriber units. The preferred embodiment can service up to forty-eight subscriber units. The intercom hardware includes a single supervision module, at least one signalling module, and one or more station modules. The intercom system provides up to six independent communication links for a forty-eight unit system. The system also provides such features as dial tone, ring-back tone, busy signal, interrupted ringing, and independent ringing. These features are provided by a hardware organization that is both expandable and comparatively inexpensive.

7 Claims, 6 Drawing Figures

FIG_2A

MODULAR, EXPANDABLE INTERCOM SYSTEM FOR A MULTIPLE-STATION TELEPHONE SUBSCRIBER INSTALLATION

BACKGROUND OF THE INVENTION

The present invention relates generally to improvements in intercom systems, and more particularly, pertains to new improved subscriber installation intercom systems wherein the intercom system is expandable on a modular basis to accommodate an increasing number of subscriber stations at the installation.

In the field of intercom systems and subscriber installations, it has been the practice to provide intercom systems that will satisfy up to a maximum number of subscriber units. If that number is exceeded, a new intercom system must be installed, and if the number of subscriber stations gets too large, a PBX system would have to be utilized. Besides being static as to the number of subscriber units that prior intercom systems could accommodate, these intercom systems were lacking in the service features that they supplied to the subscriber unit. Most prior intercom systems utilize a single talking loop. Therefore, a single subscriber unit can tie up the entire intercom. Besides these drawbacks, the prior art intercom systems do not provide the services that a PBX system does, such as individual ringing of the intercom units, dial tone, busy tone, and ring back, for example.

OBJECTS AND SUMMARY OF THE INVENTION

An object of this invention is to provide an intercom system that is expandable on a modular basis to service an increasing number of subscriber units.

Another object is to provide an intercom system that is expandable on a modular basis and utilizes a plurality of independent communication links within the system.

A further object of this invention is to provide an intercom system that is expandable on a modular basis and offers features comparable to a PBX system without the commensurate cost.

These objects and the general purpose of this invention are accomplished by providing a single supervision module to control at least one signalling module and one or more station modules. The supervision module supervises the placement of a call from one subscriber unit to another in the system. It provides the supervisory signals, such as dial tone, busy tone, and ring back tone. The supervision module scans the group modules for call initiation requests. The supervision module also provides dial pulse decoding, subscriber unit busy determination, and access time-out control. The signalling module routes ringer voltage to a particular called subscriber unit in the system. Each station module services a plurality of subscriber units by working with the supervision module to establish and terminate a connection. It operates independently to maintain the connection for the duration of the call. The station module provides talking battery, call switching, call control, busy status and dialed digit registration.

BRIEF DESCRIPTION OF THE DRAWINGS

These objects and many of the attendant advantages of this invention will be readily appreciated as the same is better understood by reference to the following detailed description when considered in conjunction with the following drawings in which like-reference numerals designate like parts throughout the Figures thereof and wherein.

DESCRIPTION OF THE PREFERRED EMBODIMENTS

Figure 1:
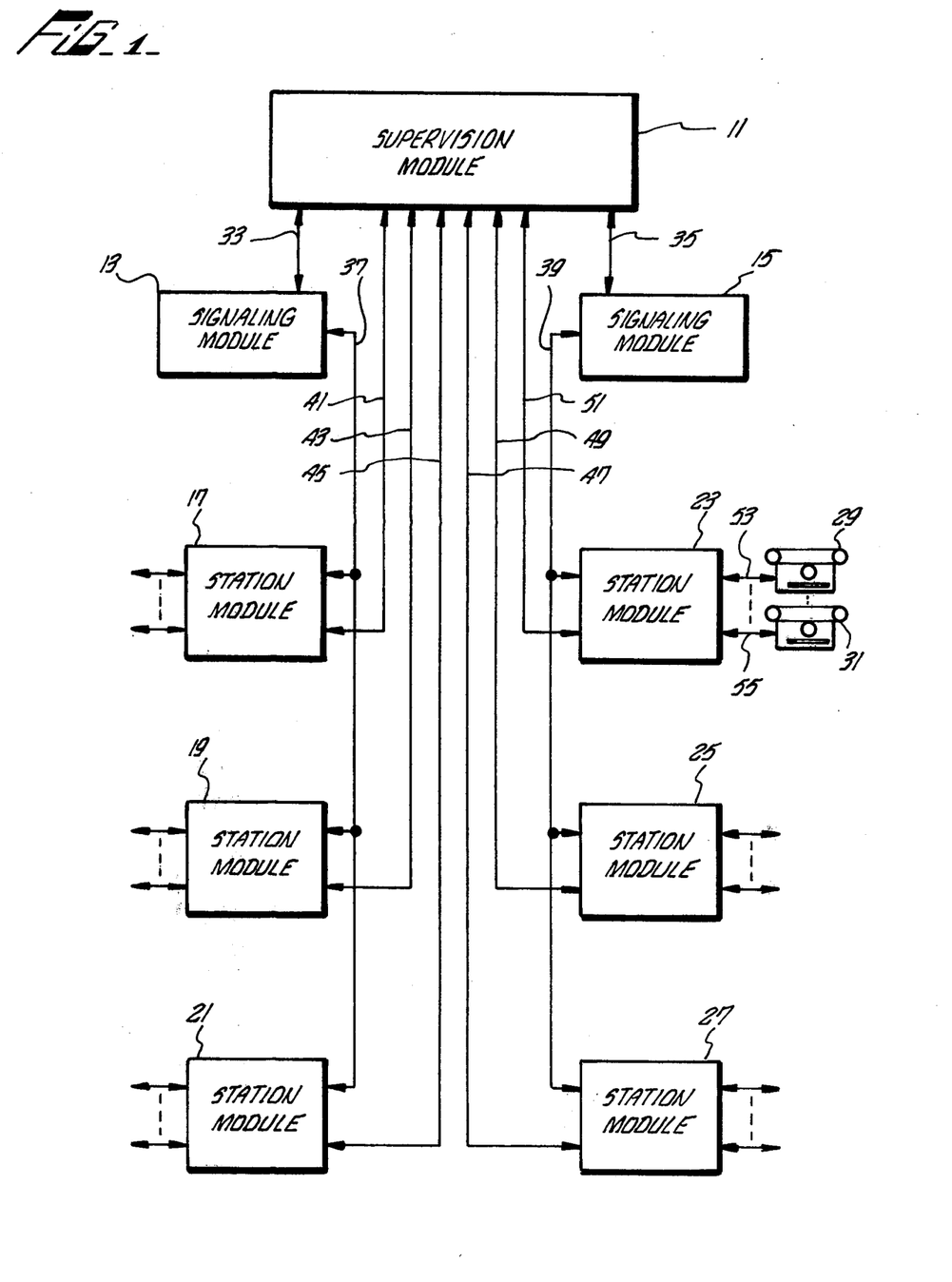
FIG. 1 is a block diagram illustrating an arrangement of the major functional modules of the present invention.

FIG. 1 illustrates the general organization of the major functional modules of the intercom system that is the present invention. Each intercom system must have a supervision module 11, at least one signalling module 13 or 15, and at least one station module 17, 19, 21, 23, 25, or 27. The supervision module 11 is designed to accommodate up to 48 subscriber units 29 and 31. The signalling module 13 or 15 is designed to accommodate up to 24 subscriber units 29 and 31. Each station module 17 through 27 is designed to accommodate up to either subscriber units 29 and 31.

Thus, by using a supervision module 11, one signalling module 15 and one station module 23, an eight subscriber unit intercom system can be accommodated. Up to 16 subscriber units can be accommodated by the addition of another station module 25. Up to a 24 subscriber unit intercom system can be accommodated by the addition of another station module 27. If a 32 station intercom system is desired, an additional signalling module 13 must be added along with an additional station module 17. Subsequently, the addition of station modules 19 and 21 will provide an intercom system for up to 48 subscriber units.

As will be more fully explained hereinafter, the supervision module 11 provides call supervision during placement of a call from one subscriber unit to another in the intercom network. The supervision module provides all the supervisory signals such as dial tone, busy tone, and ring-back tones. It also provides for periodic scanning of the station modules, dial pulse decoding, busy status determination, and access time-out control.

The station module initiates and maintains a call between two subscriber units in the intercom network. It operates in conjunction with the supervision module to establish a call and then operates independently to maintain the connection throughout the duration of the call. Upon termination of a cell, the station module summons the supervision module so that the supervision module may restore an idle state to the subscriber unit and station module. The station module provides the talking power supply, call switching, call control, busy status, and dial digit registration functions of the intercom system.

The signalling module operates in conjunction with the station module to alert subscriber units on the intercom network to incoming calls. Basically, a station module which has an incoming call applies an audible ringer voltage to the signalling module for distribution to the selected subscriber unit. The signalling module basically establishes the signalling path for the ringer voltage from a respective module.

If a 48 subscriber unit intercom system is implemented as contemplated by the present invention, six independent communication links, 41, 43, 45, 47, 49, and 51 are utilized in the system. As a result, up to six independent conversations can be carried on in the intercom network if the conversations are between the subscriber units of a particular station module. Up to three independent conversations can be conducted if all the conversations are between subscriber units located at different station modules. Obviously, this is the minimum number of conversations that can be conducted for a forty-eight subscriber unit intercom system. The number of simultaneous conversations that are permissible depend on the mix of connections between subscriber units within a station module and between station modules.

Besides using one intercommunication link per station module, the intercom system in the present invention provides for communication between up to two signalling modules 13 and 15, and the supervisory module 11 by way of trunks 33 and 35. Communication between a signalling module 15 and a plurality of station modules 23, 25, or 27 is conducted by way of trunk 39. Likewise, communication between a signalling module 13 and station module 17, 19, and 21 is conducted by way of trunk 37. Each station module, such as module 23, communicates with up to eight subscriber units 29 and 31 by way of T-R (tip and ring) and control lines 53 and 55.

Figure 2A:
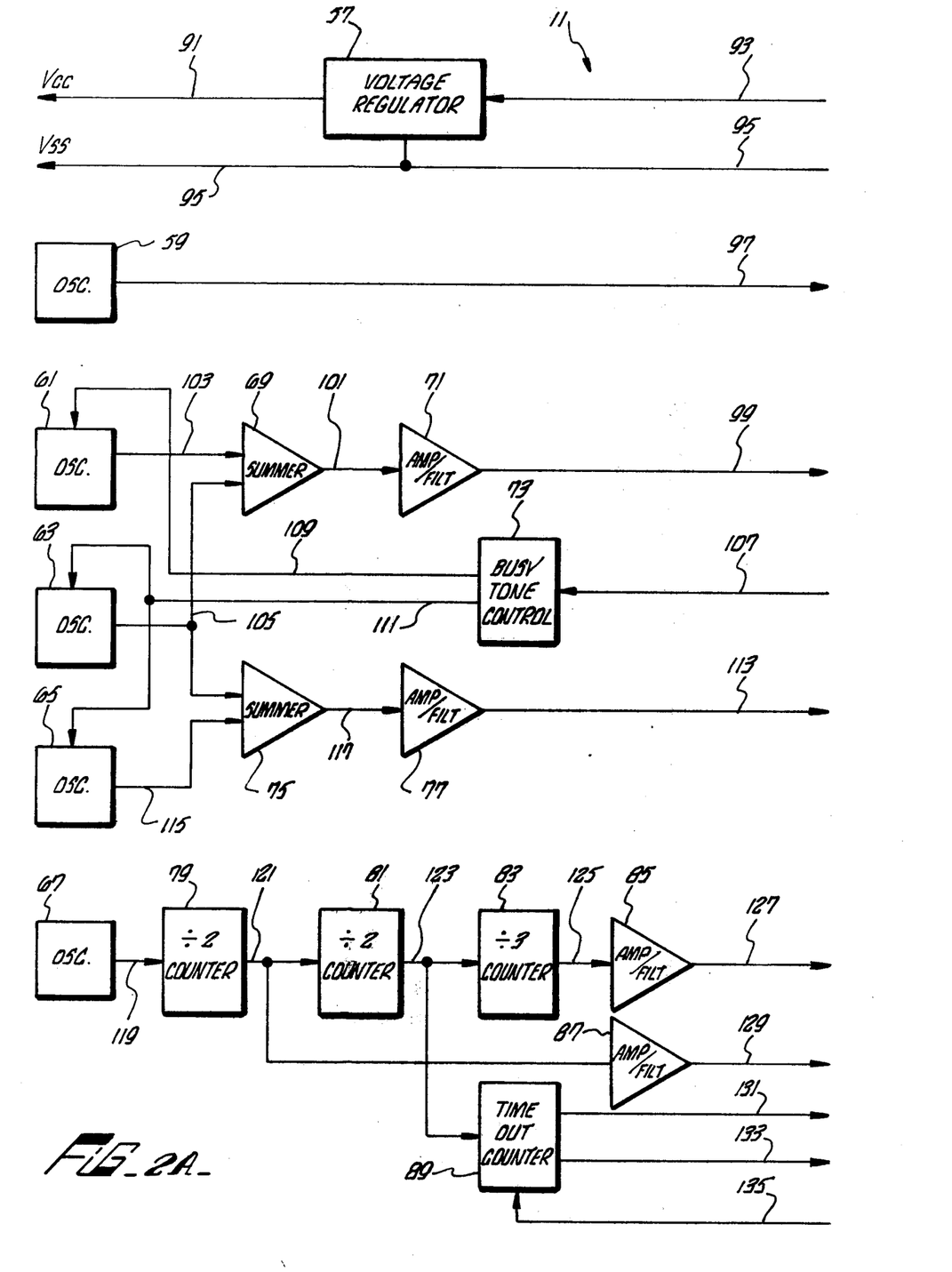
FIGS. 2A and B is a block and logic diagram of the supervision module of FIG. 1.
Figure 2B:
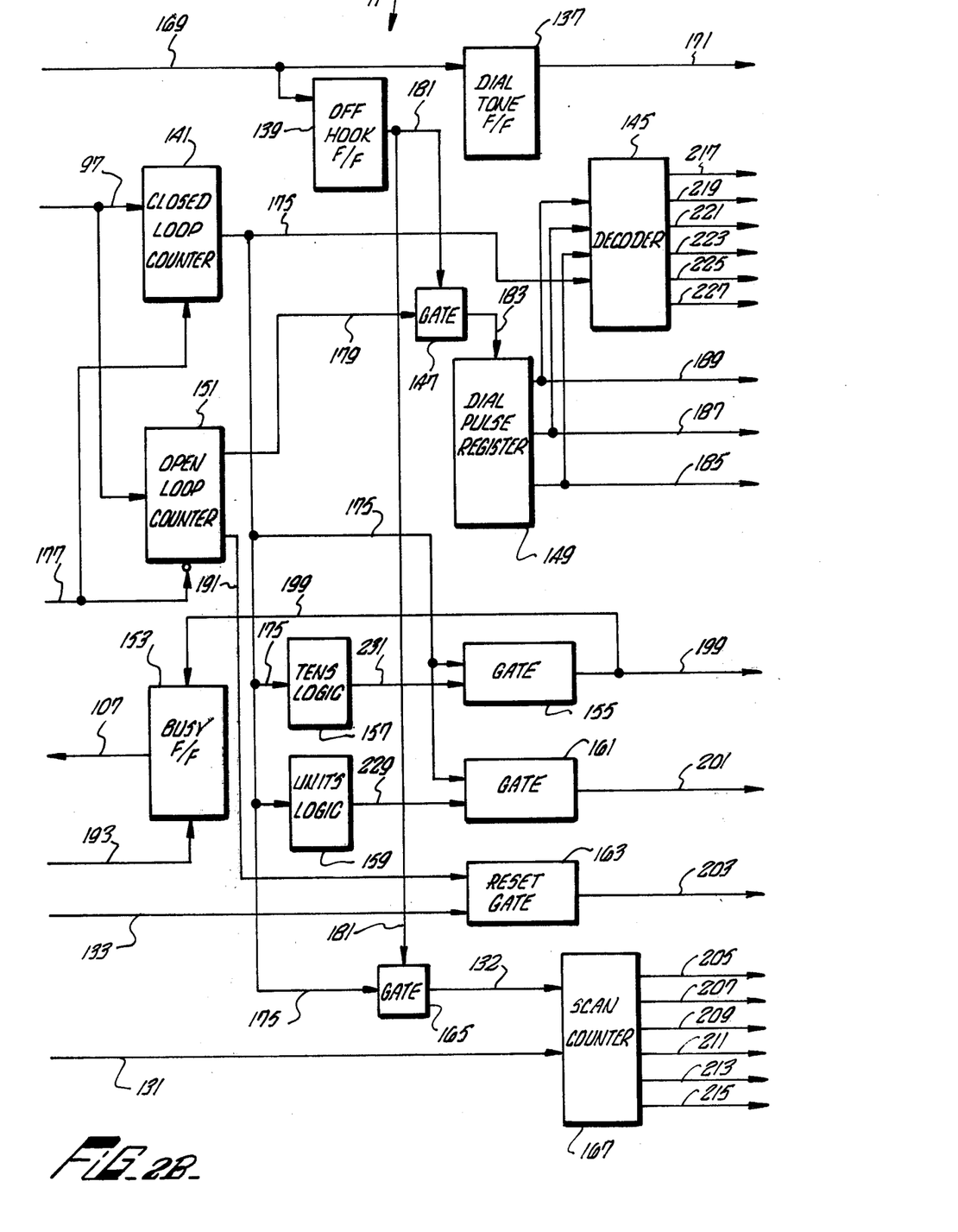

Referring to FIGS. 2A and B, a detailed block diagram and logic schematic of the supervision module 11 is illustrated. FIG. 2A is directed to the apparatus of the supervision module that generates all the supervisory signals and clocking pulses required by the intercom system.

A voltage regulator 57 of a type well known in the art, has an input terminal 93 which is essentially a voltage source for the voltage regulator, a terminal 95 or A battery voltage source, which is a −-24 volt DC unregulated filtered voltage source that is used as a common and a terminal 91 or A battery voltage source which is a −-24 volt filtered regulated talking voltage source.

Oscillators 59, 61, 63, 65, and 67 provide the various clocking and supervisory signals needed by the intercom system. Oscillator 59 is, for example, an integrated circuit timer connected in an astable operating mode to generate the dial pulse sampling clock on line 97. This sampling clock is approximately 65 cycles per second and is supplied over line 97 to the dial pulse decoding circuitry of FIG. 2B.

The dial tone signal on line 99 is generated by oscillators 61 and 63, their outputs being combined in summer 69. Oscillator 61 produces a signal having a frequency of 230 Hz. Oscillator 63 produces a signal having a frequency of 345 Hz. These signals on lines 103 and 105, respectively, are supplied to summer circuit 69 which adds the approximately sinusoidal signals linearly in a 2:1 ratio to supply a harmonically pleasing dial tone on line 101. Amplifier-filter 71 receives this dial tone, provides a unity gain to the signal and then supplies it on line 99 to the various station modules.

Oscillator 65 produces a signal having a frequency of 665 Hz. on line 115. This signal is combined with the 345 Hz. signal from oscillator 63 on line 105 in summer 75 to produce on line 117 a tone known as ring back, which is used to inform the calling subscriber unit that ringing is occurring at the called or selected station. The signal on line 117 is amplified by amplifier-filter 77, providing a unity gain, and consequently, distributes it on line 113 to the various station modules.

Oscillator 67 provides a low frequency clock signal on line 119 which is used to control the rates of lamp flashing and ringer interruption. A divide-by-two counter 79 divides the generated clock signal by two to create a symmetrical square wave signal on line 121 at a frequency of 1 Hz. This signal is distributed to the station modules by buffer driver 87 over line 129 to control the rate of lamp flashing at the various station modules. The 1 Hz. signal on line 121 is further divided by divide-by-two counter 81 and that signal on line 123 is further divided by divide-by-three counter 83 to produce a signal on line 125, which is on for 2 seconds and off for 4 seconds. This signal is distributed by buffer driver amplifier 85 on line 127 to the various station modules to control the ringing of the audible buzzers at the called station.

The $\frac{1}{2}$ Hz. signal on line 123 is supplied to a time-out counter 89 to drive counter 89 which is the interval counter for time-out purposes. The counter 89 increments in two second intervals until the terminal count state set within the counter is reached. This terminal count provides a reset signal to the call supervision module on line 133 and to the station module on line 203. The reset signal on line 131 is generated after expiration of the time-out period and advances the supervisory scan counter 167, FIG. 2B. After the time-out reset function has occurred, the time-out signal on line 133 occurs at the expiration of a time-out period and causes the resetting of the initiating station module and the supervision module to an idle state. The time-out counter 89 is restarted by a signal on line 135 which is generated when a valid response is received during call supervision, such as the occurrence of the dialing of a tens or units digit. The time-out period can be selectably set within the time-out counter 89, for example, as either a 6 or 10 second period. Therefore, if upon going off hook a subscriber unit does not begin dialing and complete dialing within either the 6 or the 10 seconds, whichever is the selected time interval, the calling subscriber unit will be automatically disconnected.

A busy-tone control 73 is responsive to a signal on line 107, which is a signal equal to the lamp-flash rate indicating a busy condition at a called station module. This signal causes busy-tone control gates 73 to apply a signal over lines 109 and 111 causing oscillators 61 and 63 to switch on for half second and off for half second, thereby creating on line 99 a busy signal to be distributed to the calling subscriber unit.

FIG. 2B illustrates the portion of the supervision module which determines busy status of a called subscriber unit and provides the other call-supervision function between station modules on a time-shared basis. The supervision module 11 sequentially scans all the station modules connected to it to determine if any of the station modules require supervision. The scanning process is accomplished by scan counter 167 which has output lines 205, 207, 209, 211, 213, and 215, each one of these lines being connectable to one of the six station modules in a forty-eight subscriber unit system.

Scan counter 167 is advanced at each count as directed by the signals on line 131 and 132. The signal on line 131 is the time-out advance signal generated by time-out counter 89. The signal on line 132 is the step signal output of gate 165, which is essentialy the dial-pulse sampling signal received on line 97 as operated on by closed-loop counter 141 and controlled by the output signal on line 181 of off-hook flip-flop 139.

As each group select line 205 through 215 is enabled, it connects the respective station module to the call supervision module 11 for the duration of the supervisory period. If no supervision is required by the selected group of the counter, scan counter 167 is advanced to the next group and the process repeats itself until a particular selected supervision module requests supervision which occurs by off-hook flip-flop 139 sensing a busy indication on line 169. When such a call for supervision occurs, the signal on line 132 is not generated and scan counter 167 does not step to the next supervision module unless the time-out counter 89 times out before dialing occurs or the subscriber unit at the station module calling for supervision hangs up. The scan counter 167 will, therefore, remain locked onto the requesting station module until call supervision is completed.

The call supervision module will initiate dial tone to a subscriber unit when the off-hook condition of that subscriber unit is detected. The off-hook condition on line 169, which is a common busy bus for all the subscriber units in the intercom system, is sensed by off-hook flip-flop 139. Flip-flop 139 generates a signal on line 181 that enables a gate 147 allowing the supervision module to receive dialing pulses. The output of flip-flop 139 is also supplied to gate 165 disabling that gate and preventing scan counter 167 from stepping to another station module select link.

The off-hook condition on line 169 is also sensed by dial tone flip-flop 137 which generates a common signal on line 171 that is supplied to the calling station module to which the supervision module is connected. This control signal is supplied to the station module, causing the dial-tone switch therein to be activated. The dial tone is supplied to the subscriber unit demanding service until the calling party goes on hook, until dialing begins, or until the time-out period expires.

The flow-of-loop current in a particular station module, which is receiving call service from the supervision module, is monitored both during open-loop (no current flow) and closed-loop (current flow) conditions. Open-loop counter 151 generates clock pulses during the open-loop state, and closed-loop counter 141 generates clock pulses during the closed-loop state, both counters being driven by the dial-pulse sampling signals on line 97. A persisting open-loop (no current flow) state causes open-loop counter 151 to generate on line 191 a reset pulse causing reset gate 163 to provide a signal on line 203. This signal causes the particular station module connected to the supervision module to go back to its idle state. Upon dialing proceeding, the loop current will be pulsed, and as a result, will generate a clock pulse for each break pulse in a dial digit. The open-loop counter 151 generates these clock pulses. The inter-digit pulse is generated by closed-loop counter 141 from the closed-loop condition between the dial digits. Consequently, the output of open-loop counter 151 on line 179 is passed through gate 147 to line 183 and to dial-pulse register 149. The output of closed-loop counter 141 on line 175, representing the inter-digit pulses, are supplied to decoder 145 along with the output of dial-pulse register 149 on lines 189, 187, and 185.

Figure 3A:
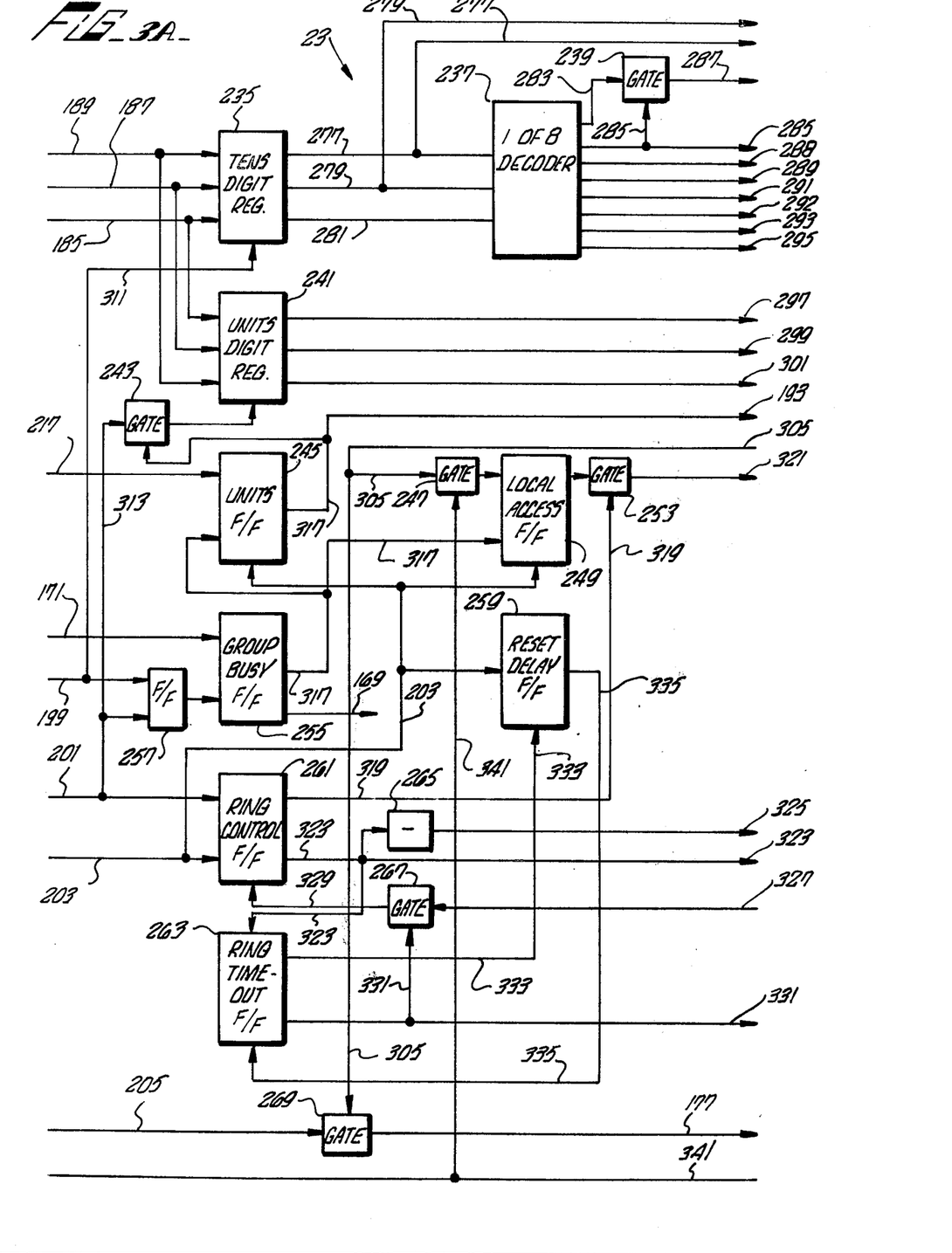
FIGS. 3A and B is a block and logic diagram of one of the station modules of FIG. 1.

As the dial pulses detected by closed-loop counter 141 and open-loop counter 151 are supplied to the dial-pulse register 149, the first pulse of the tens digit enables the tens steering logic 157 to pass on line 231, through gate 155, to line 199 enabling the tens digit register 235 [FIG. 3A] station module to which the call is directed to receive the tens digit. For purposes of explanation and since only one station module is illustrated, that module is assumed to be the calling and called station module. However, that need not be the case.

Decoder 145 receives the tens digit pulses and selects the one of the six station modules to which the call is directed as identified by the tens digit by enabling one of the lines 217, 219, 221, 223, 225, or 227. This signal from decoder 145 interrogates the particular station module to determine if it is busy in a manner that will be more fully described hereinafter. If the chosen station module is not busy, the dialed tens digit will be registered in the tens digit register 235 of the calling station module, and the station module, in a manner which will be more fully described hereinafter, will connect the calling station through one of the inter-group links to the called station module. If the desired station module is busy, the busy flip-flop 153 is set by the signal on line 193 causing a signal on line 107 to be generated that, as described earlier, will cause busy-tone control 73 to initiate the generation of a busy-tone, which is then supplied to the calling subscriber unit.

Upon the pulses of the second, or units, digit being dialed, the units logic 159 enables gate 161 causing the pulses on line 201 to be supplied to the called station module. The units digit, in a manner that will be explained more fully hereinafter, cause a path for the audible ringer source voltage to be established to the called subscriber unit. At the same time, the station module busy status is set and the ringing circuit of the station module is enabled.

Figure 3B:
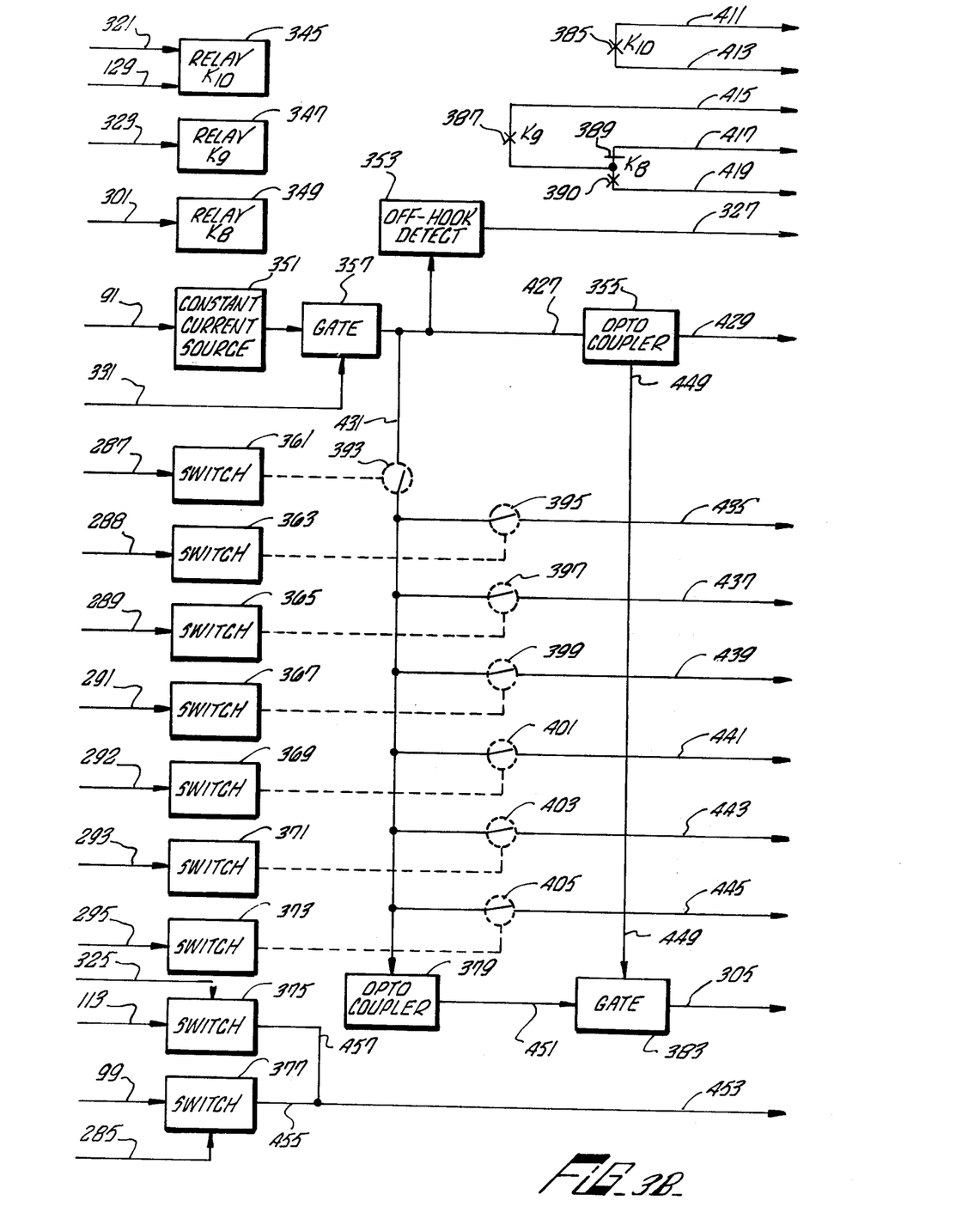

The specifics of an individual station module is illustrated in FIGS. 3A and 3B. FIG. 3A illustrates in functional form the logic circuits in the station module. FIG. 3B illustrates, basically, the switching as a result of the logic functions of FIG. 3A.

A constant current source 351 connected to ground by line 91 supplies current to power the subscriber units connected to the particular station module. At most, three stations will be off hook for any given call at that station module. Each station will, therefore, draw at least one third of the current from current source 351. When a subscriber unit accesses one of the six links 435, 437, 439, 441, 443, or 445, current flows from the constant current source through contacts 393, the opto-coupler 379, and to the station by way of line 453, which is the tip line for the subscriber units connected to that particular station module.

The loop current coupled through opto-coupler 379, and enable gate 383 to line 305 is supplied to gate 247 and, in turn, to local access flip-flop 249. The output of local access flip-flop 249 is supplied through gate as a lamp driver signal on line 321. The signal generated on line 305 by gate 383 is also supplied to gate 269 which generates a signal on line 177, which is supplied back to the supervision module indicating off-hook status.

As was noted earlier, when this off-hook status signal is supplied on line 177 to the supervision module, it causes the initiation of a dual tone at the calling subscriber and prepares itself to receive the dial digits from the off-hook, or calling, subscriber. Upon dialing commencing, the dial pulses generated by the calling subscriber are detected by opto-coupler 379 and are routed to the call-supervision module over bus 177 to the closed-loop and open-loop counter 141 and 151 of the supervision module [FIG. 2B].

When the tens digit has been dialed and decoded by the supervision module, the selected station module is interrogated to determine if that station module is busy.

This is done by a signal on line 217 of our example to units flip-flop 245 [FIG. 3A]. If the output of group busy flip-flop 255 on line 317 indicates not busy status for that station module, units flip-flop 245 is set and its output on line 317 generates a signal on line 193 to busy flip-flop 153 (FIG. 2B) of the supervision module. At the same time, the signal enables gate 243 thereby permitting units digits register 241 to be loaded or receive the units digit when dialed. A prior busy status generated by a group busy flip-flop 255 will inhibit units flip-flop 245, and therefore, prevent the units register 241 from being loaded and, in turn, supplies the calling station module with a busy tone.

After the units is loaded in register 241, as a binary number over lines 189, 187, and 185 from dial pulse register 149 (FIG. 2B) of the supervision module, it is presented to the signalling module over lines 297, 299, and 301, in order to direct the ring voltage to one of the eight stations in the dialed station module. At the same time, the ring control flip-flop 261 is set to initiate ringing over line 323. The signal on line 323 starts ring time-out flip-flop 263. Ring time-out flip-flop 263, if desired, may be designed so as to permit a selection of ringing time outs, such as, for example, four rings or seven rings. When the called party answers before ringing time-out occurs, the shift in DC line is detected by open-loop counter 151 (FIG. 2B) in the supervision module, which in turn provides a signal to reset gate 163 that generates a signal on line 203, causing the ring-control flip-flop 261 to be reset, and in turn, resetting the ring time-out flip-flop 263. Resetting of ring-control flip-flop 261 stops the ringing at the station and cuts the control current source 351 by disabling gate 357.

At the same time that ring-control flip-flop 261 is reset by the signal on line 203, reset-delay flip-flop 259 is set by the same signal, thereby preparing the supervision module to return to the idle state once ringing time out occurs.

When a call is completed and the calling subscriber unit again goes on hook, opto couplers 355 and 379 detect the loss of current, and, as a result, the next time the supervision module interrogates this specific station module, the signal on line 203 to ring control flip flop 261 will cause the station module to be reset.

Dial tone is supplied to the station modules over line 99 from the supervision module to a switch 377 (FIG. 3B) after a subscriber unit at that station goes off-hook. Upon dialing proceeding and one of eight decoder 237 decoding the tens digit, dial tone is cut off by a signal on line 285 from decoder 237. The same signal on line 285 enables gate 239 to provide a signal on line 287 to switch 361 to actuate contacts 393, allowing link selection to proceed.

The signals on line 288, 289, 291, 292, 293, and 295 activate one of the switches 361, 363, 365, 367, 369, 371, or 373, respectively, to close their respective contacts 395, 397, 399, 401, 403, 405, and select one of the links 435, 437, 439, 441, 443, or 445.

When the appropriate link has been selected to connect the calling subscriber unit to the called subscriber unit, which may be connected to another station module, and ringing is being supplied to the called subscriber as evidenced on line 325 to switch 375, the ringback tone on line 113 is supplied through gate 375 to the calling subscriber over line 453.

At the same time, the lamp driver signal on line 321 enables K10 relay 345 to close its K10 contacts 385, thereby connecting the lamp supply connected to line 411 to the lamp circuit connected to line 413. If a lamp-flash signal is being supplied on line 129 by the supervision module to K10 relay 345, the relay contacts are opened and closed in accordance therewith to provide lamp flashing.

The called station module receives the appropriate ringing instruction on line 201 and causes a ringer-drive signal to be generated on line 323 to K9 relay 347. The relay 347 causes its contacts 387 to close, thereby connecting the audible signal source on line 415 to the common connection between K8 contacts 389 and 390 of K8 relay 349.

K8 relay 349 is either activated or deactivated, depending on the signal received over line 310 from the units digit register 241 (FIG. 3A). In its unactivated state, K8 contacts 389 are closed and contacts 390 are open. In its activated state, K8 contacts 389 are opened and 390 are closed. Both lines 417 and 419 go to the signalling module 15. As will be seen hereinafter, the state of K8 contacts 389 and 390 select four of the possible eight subscriber units at the called station module to receive the ringer voltage. Which of these four subscriber units is chosen will be determined as follows, with reference to the signalling module.

Figure 4:
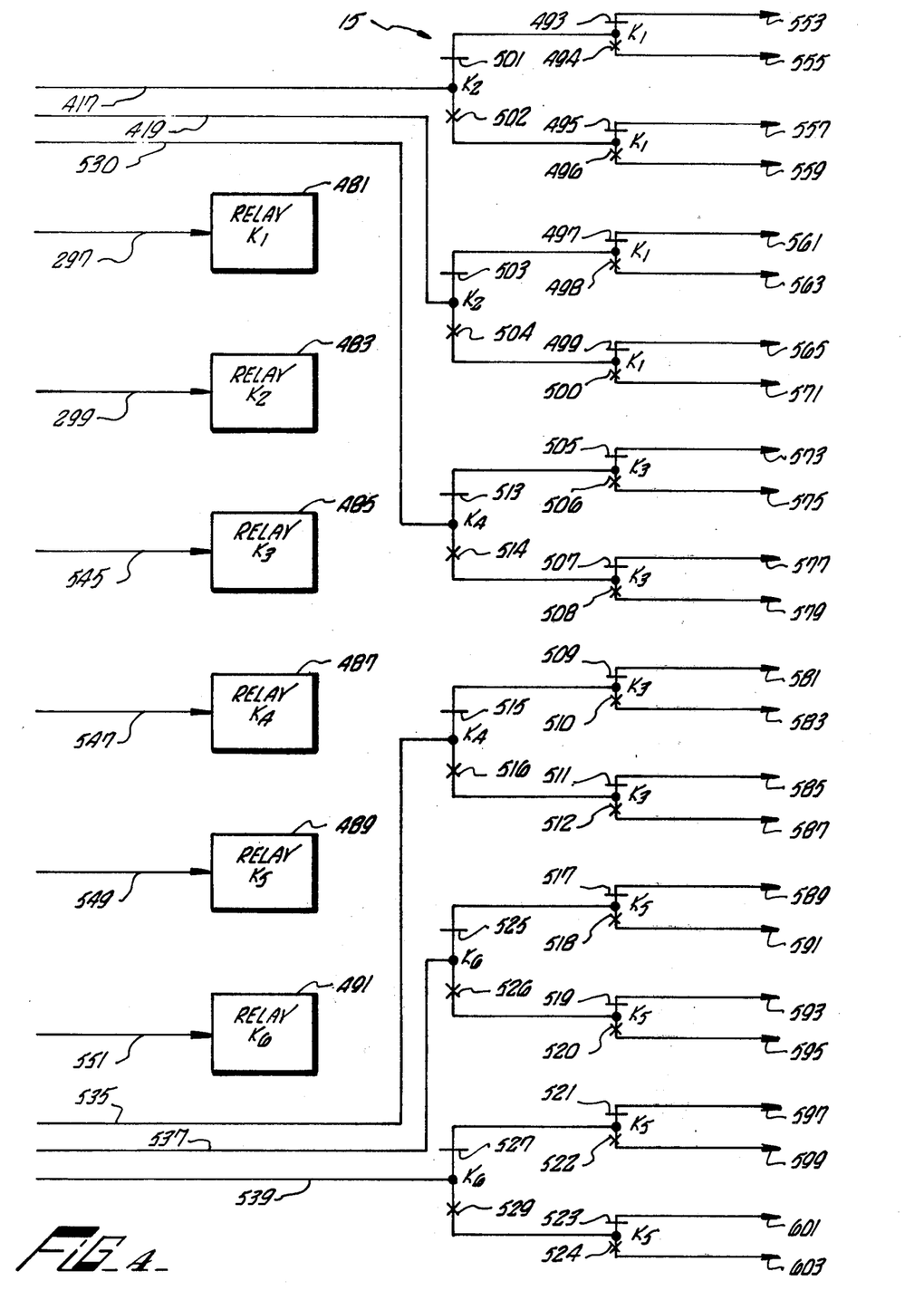
FIG. 4 is a block and schematic diagram of one of the signalling modules of FIG. 1.

The signalling module illustrated in FIG. 4 represents the routing circuitry for a 24 subscriber unit system, or one which utilizes three station modules, each station module having eight subscriber units connected to it. Thus, for our example of the station module illustrated in FIGS. 3A and 3B, K8 relay 349 selects either the four subscriber group connected to line 417 or the four subscriber group connected to line 419, depending on whether the contacts 389 and 390 are respectively opened or closed.

K1 relay 481 and K2 relay 483 respond to the units digit indications on lines 297 and 299 from units digit register 241 (FIG. 3A) to determine which of the four subscriber units of the particular four group chosen by the K8 contacts is to be selected. Here again, the particular subscriber unit selected for ringing voltage to be supplied to it is dependant on the switch contact closures of relays K1 and K2.

For example, if K2 relay 483 is unactivated, its contacts 501, 502, 503, and 504 will be in the state shown. Assuming that ringing voltage is coming in on line 417, it will pass through closed contacts 501 to K1 contacts 493 and 494. Thus, the state of K1 relay 481 determines whether the subscriber unit connected to line 553 or the unit connected to line 555 receives the ringing voltage.

The other relays and respective contacts are broken down into a similar group arrangement. K3 and K4 relays 485 and 487, respectively, receive signals on lines 545 and 547, respectively, to activate the contacts 505–516. These relays supply ringer voltage to one of the subscriber units connected to lines 573–587.

K5 and K6 relays 489 and 491, respectively, receive commands on lines 549 and 551, respectively, to activate their contacts 517–529 and thereby supply ringer voltage to one of the lines 589–603. Lines 530 and 535 carry ringer voltage from another second station module. Lines 537 and 539 carry ringer voltage from a third station module.

What has been described is a modular intercom system that is expandable to accommodate customer growth while providing a plurality of talking paths and features similar to a PBX installation.

I claim:

1. A modular intercom system for use with a key telephone system wherein the intercom lines of the system increase as more key telephones are added to the key telephone system, said intercom system comprising:
   a plurality of station control means, each control means adapted to communicate with a plurality of key telephones over their intercom circuits, for initiating a service request by one of the key telephones, and maintaining an intercom connection between two key telephones in the system, each station control means having a separate interconnect link to each other station control means in the system;
   a supervision means connected to each of the station control means in the system for sensing a service request initiated by a station control means and controlling the intercom connection of one key telephone to another key telephone over one of the interconnect links in the intercom system; and
   at least one signalling means connected to each of said station control means and the supervision means for routing control signals to the individual key telephone intercom circuits under control of said supervision means and the respective station control means.

2. The modular intercom system of claim 1 wherein said supervision means comprises:
   means responsive to a service request from a station control means for generating and routing a dial tone to the key telephone requesting service;
   means responsive to reception of rotary dial pulses for generating and routing ring control signals to the called key telephone identified by the rotary dial pulse;
   means responsive to the generation of ring control signals for generating and routing ringback tone signals to the calling key telephone that initiated the rotary dial pulses; and
   means responsive to a busy indication from a station control means for generating and routing a busy tone to the calling key telephone.

3. The modular intercom system of claim 1 wherein said supervision means includes means responsive to rotary dial pulses for decoding the rotary dial pulses to binary key telephone identification signals.

4. The modular intercom system of claim 1 wherein said supervision means includes means for terminating ringing control after a preselected time has elapsed without an answer from the called key telephone.

5. The modular intercom system of claim 1 wherein said station control means includes means for providing talking potential to a pair of connected key telephones.

6. The modular intercom system of claim 1 wherein said station control means includes switch means actuated by control signals from said supervision means to connect said station control means to one of the interconnect links in the intercom system.

7. The modular intercom system of claim 1 wherein said station control means includes a constant current source for providing talking current in the system, said current source being connected into the talking loop through a pair of optical coupling devices.

* * * * *

UNITED STATES PATENT OFFICE
CERTIFICATE OF CORRECTION

Patent No. 4,135,063           Dated January 16, 1979

Inventor(s) Lynn R. Bosen

It is certified that error appears in the above-identified patent and that said Letters Patent are hereby corrected as shown below:

Column 2, line 24, delete "either" and insert --eight--.

Column 2, line 51, delete "cell" and insert --call--.

Column 4, line 53, delete "function" and insert

--functions--.

Column 6, line 51, insert --253-- after the word "gate".

Column 6, line 58, delete "dual" and insert --dial--.

Column 8, line 14, delete "310" and insert --301--.

Signed and Sealed this

First Day of May 1979

[SEAL]

Attest:

RUTH C. MASON  
Attesting Officer

DONALD W. BANNER  
Commissioner of Patents and Trademarks